(12) United States Patent
Jones et al.

(10) Patent No.: US 8,442,435 B2
(45) Date of Patent: May 14, 2013

(54) METHOD OF REMOTELY CONTROLLING AN EAR-LEVEL DEVICE FUNCTIONAL ELEMENT

(75) Inventors: Michael R. Jones, Naperville, IL (US); Caslav V. Pavlovic, Palo Alto, CA (US); Ephram Cohen, San Francisco, CA (US); Nicholas R. Michael, San Francisco, CA (US); Meena Ramani, Cupertino, CA (US)

(73) Assignee: Sound ID, Palo Alto, CA (US)

( * ) Notice: Subject to any disclaimer, the term of this patent is extended or adjusted under 35 U.S.C. 154(b) by 227 days.

(21) Appl. No.: 12/841,084

(22) Filed: Jul. 21, 2010

(65) Prior Publication Data

US 2011/0217930 A1    Sep. 8, 2011

Related U.S. Application Data

(63) Continuation-in-part of application No. 12/716,209, filed on Mar. 2, 2010.

(51) Int. Cl.
*H04B 7/00* (2006.01)

(52) U.S. Cl.
USPC ......... 455/41.2; 455/418; 455/419; 455/41.1; 455/569.2; 455/575.2

(58) Field of Classification Search .................. 455/41.2, 455/3.03, 3.04, 418–420, 556.1, 575.2
See application file for complete search history.

(56) References Cited

U.S. PATENT DOCUMENTS

| | | | |
|---|---|---|---|
| 5,721,783 | A | 2/1998 | Anderson |
| 6,212,496 | B1 | 4/2001 | Campbell et al. |
| 6,944,474 | B2 | 9/2005 | Rader et al. |
| 7,328,151 | B2 | 2/2008 | Muesch |
| 2004/0001602 | A1 | 1/2004 | Moo et al. |
| 2004/0136555 | A1 | 7/2004 | Enzmann |

(Continued)

FOREIGN PATENT DOCUMENTS

| | | |
|---|---|---|
| DE | 10222408 A1 | 11/2003 |
| WO | 0124576 A1 | 4/2001 |

(Continued)

OTHER PUBLICATIONS

Lippmann, R. P. et al., Study of multichannel amplitude compression and linear amplification for persons with sensorineural hearing loss, J. Acoust. Soc. Am. 69(2), Feb. 1981, pp. 524-534.

(Continued)

*Primary Examiner* — Meless N Zewdu
*Assistant Examiner* — Michael Nguyen
(74) *Attorney, Agent, or Firm* — James F. Hann; Haynes Beffel & Wolfeld LLP

(57) ABSTRACT

A method controls a functional element of an ear-level device of a type including a functional element, a memory, a microphone and a speaker, each coupled to a processor. Communication between the ear-level device and a companion device, such as a mobile phone, is established. A functional element for control is selected through the user interface of the companion device. A control instruction for controlling the selected functional element is chosen using the user interface and is transmitted from the companion device to the ear-level device to provide instruction to the ear-level device to control the selected functional element in the chosen way.

17 Claims, 9 Drawing Sheets

U.S. PATENT DOCUMENTS

| | | | |
|---|---|---|---|
| 2005/0248717 A1 | 11/2005 | Howell et al. | |
| 2005/0260978 A1 | 11/2005 | Rader et al. | |
| 2007/0180025 A1 | 8/2007 | Kobayakawa et al. | |
| 2007/0255435 A1* | 11/2007 | Cohen et al. | 700/94 |
| 2008/0165980 A1 | 7/2008 | Pavlovic et al. | |
| 2009/0117945 A1* | 5/2009 | Mahler et al. | 455/569.1 |
| 2009/0141921 A1 | 6/2009 | Perkins et al. | |
| 2009/0180631 A1 | 7/2009 | Michael et al. | |
| 2010/0027824 A1 | 2/2010 | Atamaniuk et al. | |
| 2010/0284556 A1* | 11/2010 | Young | 381/314 |

FOREIGN PATENT DOCUMENTS

| | | |
|---|---|---|
| WO | 0154458 A2 | 7/2001 |
| WO | 2006105105 A2 | 10/2006 |
| WO | 2008086286 A2 | 7/2008 |

OTHER PUBLICATIONS

Q1 User Guide. Manual [online]. BlueAnt Wireless. 2009 [retrieved on Apr. 12, 2011]. Retrieved from the internet: <URL:http://docs.blueantwireless.com/pdf/Q1UserGuide(en).pdf>, 43 pages.

International Search Report and Written Opinion of the ISA mailed Dec. 12, 2011, from corresponding application No. PCT/US2011/044849, filed Jul. 21, 2011, 11 pages.

* cited by examiner

METHOD OF REMOTELY CONTROLLING AN EAR-LEVEL DEVICE FUNCTIONAL ELEMENT

CROSS-REFERENCE TO RELATED APPLICATIONS

The present application is a continuation-in-part of U.S. patent application Ser. No. 12/716,209, filed 2 Mar. 2010, entitled Earpiece with Voice Menu, the disclosure of which is incorporated by reference.

BACKGROUND OF THE INVENTION

The present invention relates to personalized sound systems, in particular an ear-level device adapted to be worn on the ear, and the use of a companion device to control one or more functional elements of the ear-level device.

Ear-level devices, including headphones, earphones, head sets, hearing aids and the like, are adapted to be worn on the ear of a user and provide personal sound processing. U.S. patent application Ser. No. 11/569,449, entitled Personal Sound System Including Multi-Mode Ear-level Module with Priority Logic, published as U.S. Patent Application Publication No. US-2007-0255435-A1, is incorporated by reference as if fully set forth herein. In US-2007-0255435-A1, a multi-mode ear-level device is described in which configuration of the ear-level device and call processing functions for a companion mobile phone are described in detail.

Ear-level devices typically have one or more functional elements, such as on-off switches and volume controls, on the device itself. However, because of the small size of many ear-level devices, the size, number and placement of functional elements is typically limited. This limitation on the functional elements can reduce the flexibility and usability of the ear-level device.

SUMMARY OF THE INVENTION

A first aspect of the invention is directed to a method of controlling at least one functional element of an ear-level device, the ear-level device of a type comprising a functional element, a memory, a microphone and a speaker, each coupled to a processor. The method is carried out as follows. Communication between the ear-level device and a companion device is established. The companion device comprises a user interface. A functional element for control is selected through the user interface. A way of controlling the selected functional element is chosen using the user interface. A selected functional element control instruction, corresponding to the chosen way of controlling the selected functional element, is transmitted from the companion device to the ear-level device, thereby providing instruction to the ear-level device to control the selected functional element in the chosen way. In some examples, communication is established with a mobile phone as the companion device. In some examples, the choosing step comprises enabling/disabling the selected functional element, and the transmitting step comprises transmitting an enabling/disabling instruction for the selected functional element to the ear-level device, thereby providing instruction to the ear-level device to enable/disable the selected functional element. In some examples, the choosing step comprises choosing a way of controlling the functional element from a plurality of ways of controlling the functional element provided by the companion device. In some examples, a functional aspect of the ear-level device, such as the sound level at the microphone of the ear-level device, may be monitored using the companion device.

A second aspect of the invention is directed to a method of controlling at least one functional element of an ear-level device, the ear-level device of a type comprising a functional element, a memory, a microphone and a speaker, each coupled to a processor. The method is carried out as follows. Communication is established between the ear-level device and a mobile phone acting as a companion device, the companion device comprising a user interface. A functional element for control is selected through the user interface. A way of controlling the selected functional element is chosen using the user interface by enabling/disabling the selected functional element. An enabling/disabling instruction for the selected functional element is transmitted from the companion device to the ear-level device, thereby providing instruction to the ear-level device to enable/disable the selected functional element. A functional aspect of the ear-level device, such as the sound level at the microphone of the ear-level device, is monitored using the companion device. In some examples, a new function is chosen for the selected functional element, and the new function instruction is transmitted to the ear-level device. In some examples, a way of controlling the functional element is chosen from a plurality of ways provided by the companion device.

Other aspects and advantages of the present invention can be seen on review of the drawings, the detailed description, and the claims which follow.

DETAILED DESCRIPTION

Figure 1:
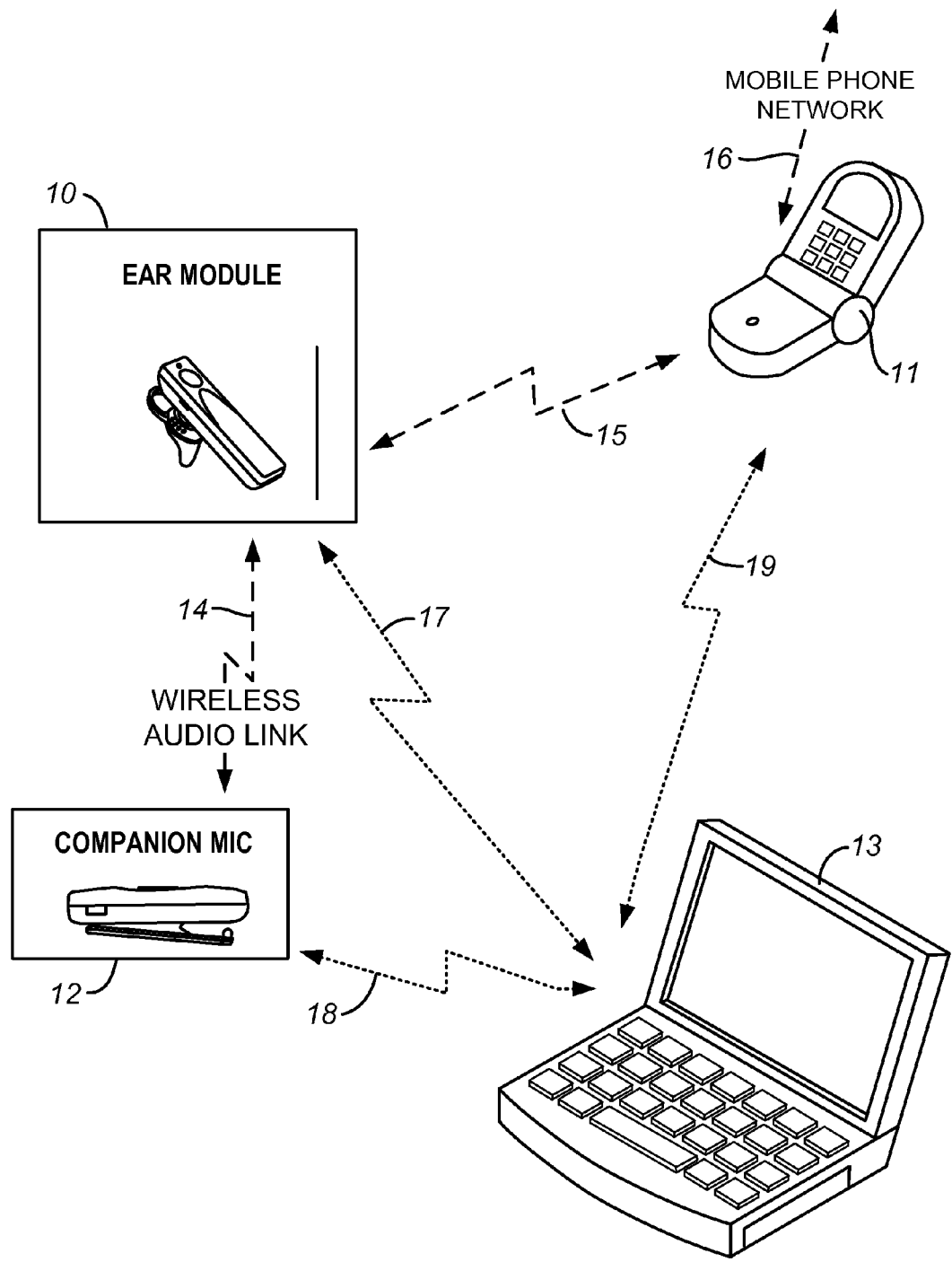
FIG. 1 is a simplified diagram of a wireless network including an ear-level device supporting a voice menu, as described herein, along with companion modules which can communicate with the ear-level device.

FIG. 1 illustrates a wireless network including an ear module 10, also referred to as an ear-level device, adapted to be worn at ear-level, and a mobile phone 11. Ear module 10 is shown in more detail in FIGS. 4 and 5. Also included in the illustrated network are a companion computer 13, and a companion microphone 12. The ear module 10 can include an environmental mode for listening to sounds in the ambient environment. The network facilitates techniques for providing personalized sound at the ear module 10 from a plurality of companion audio sources such as mobile phones 11, computers 13, and microphones 12, as well as other companion devices such as televisions and radios.

The ear module 10 is adapted to operate in a plurality of modes, corresponding to modes of operating the ear module, such as a Bluetooth® mode earpiece for the phone 11, and the environmental mode. The ear module and the companion devices can execute a number of functions in support of utilization of the ear module in the network.

The ear module 10 includes a voice menu mode in which data indicating a function to be carried out by the ear module or by a companion device, such as a mobile phone 11, is selected in response to user input on the ear module 10. The user input can be for example the pressing of a button or other functional element on the ear module 10.

In some examples, ear module 10 can support a voice menu by which functions executable by the ear module or by a companion device, typically a mobile phone, can be selected using input at the ear-level device. For example, by pushing a button on ear module 10 a voice menu is activated announcing a set of functions, such as voice dial, last number redial, battery status, favorite number, favorite number 2, handset voice dial, pair, and so on. When the function that the user wants is announced through the speaker on ear module 10, the user can, for example, press the same button which activated the execution of the voice menu. The specific functions, as well as their order in the sequence, available with the voice menu feature of ear module 10 can be selected by the user using a program on the companion device; the selected functions are then transmitted to and stored in memory in the ear module. This voice menu feature is described in U.S. patent application Ser. No. 12/716,209, filed 2 Mar. 2010 and entitled Earpiece with Voice Menu, the disclosure of which is incorporated by reference.

In one embodiment described herein, the wireless audio links 14, 15 between the ear module 10 and the linked companion microphone 12, between the ear module 10 and the companion mobile phone 11, respectively, are implemented according to Bluetooth® compliant synchronous connection-oriented SCO channel protocol (See, for example, Specification of the Bluetooth System, Version 4.0, 17 Dec. 2009). Wireless link 16 couples the mobile phone 11 to a network service provider for the mobile phone service. The wireless configuration links 17, 18, 19 between the companion computer 13 and the ear module 10, the mobile phone 11, the linked companion microphone 12, and optionally the other audio sources are implemented using a control channel, such as a modified version of the Bluetooth® compliant serial port profile SPP protocol or a combination of the control channel and SCO channels. (See, for example, BLUETOOTH SPECIFICATION, SERIAL PORT PROFILE, Version 1.1, Part K: 5, 22 Feb. 2001).

Of course, a wide variety of other wireless communication technologies may be applied in alternative embodiments. The mobile phone 11, or other computing platform such as computer 13, preferably has a graphical user interface and includes for example a display and a program that displays a user interface on the display such that the user can select functions of the mobile phone 11 such as call setup and other telephone tasks, which can then be selectively carried out via user input on the ear module 10, as described in more detail below. Alternatively, the user can select the functions of the mobile phone 11 via a keyboard or touch pad suitable for the entry of such information. The mobile phone 11 provides mobile phone functions including call setup, call answering and other basic telephone call management tasks in communication with a service provider on a wireless telephone network or other network. In addition, and as discussed below, mobile phone 11, or other computing platform such as computer 13, can be used to allow the user to control at least one functional element of ear module 10.

The companion microphone 12 consists of small components, such as a battery operated module designed to be worn on a lapel, that house "thin" data processing platforms, and therefore do not have the rich user interface needed to support configuration of private network communications to pair with the ear module 10. For example, thin platforms in this context do not include a keyboard or touch pad practically suitable for the entry of personal identification numbers or other authentication factors, network addresses, and so on. Thus, to establish a private connection pairing with the ear module, the radio is utilized in place of the user interface.

Figure 2:
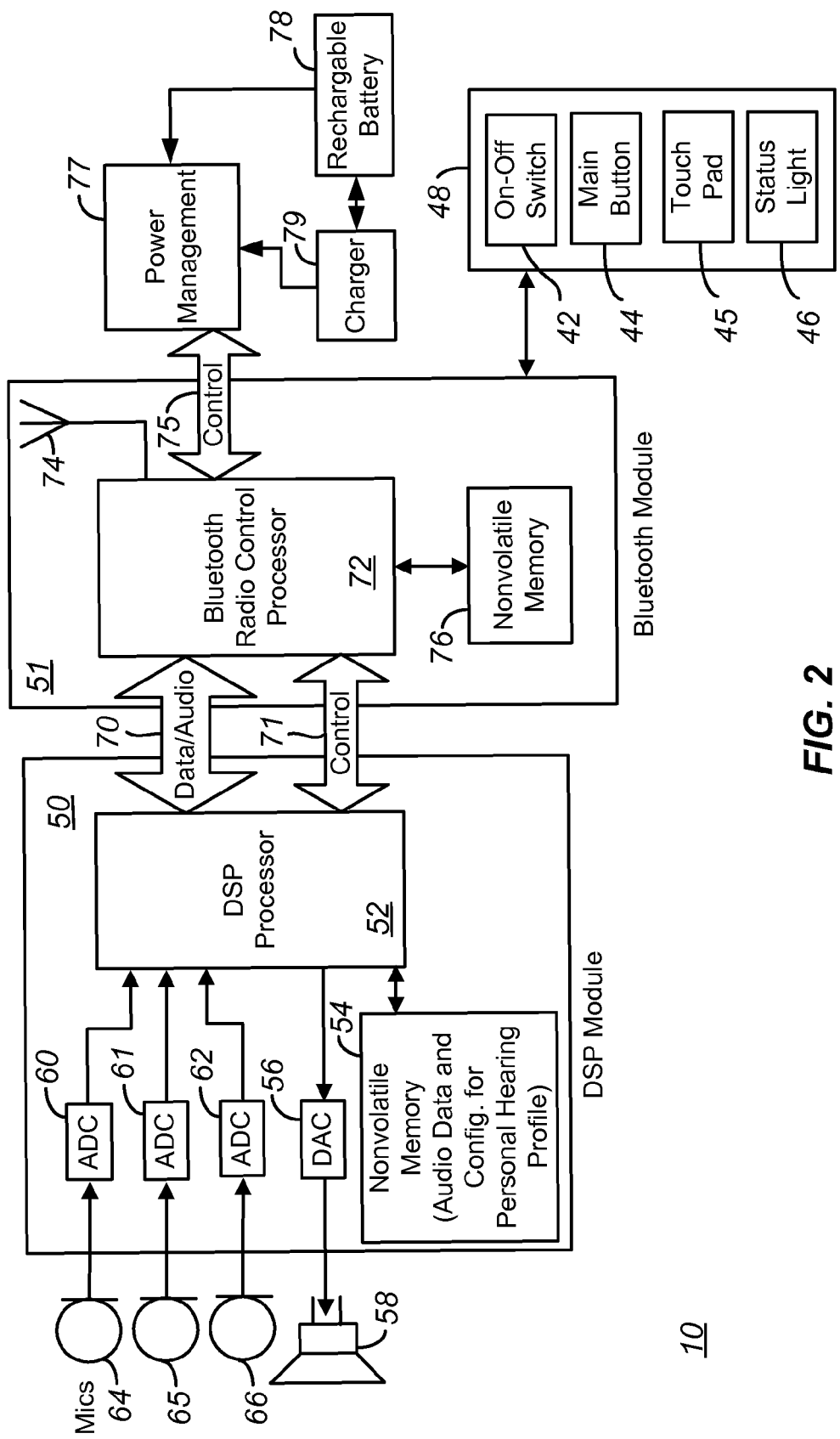
FIG. 2 is a simplified block diagram of circuitry in an ear-level device.

FIG. 2 is a system diagram for microelectronic and audio transducer components of a representative embodiment of the ear module 10. The system includes a data processing module 50 and a radio module 51. The data processing module includes a digital signal processor 52 (hence the reference to "DSP" in some of the figures) coupled to nonvolatile memory 54. A digital-to-analog converter 56 converts digital output from the digital signal processor 52 into analog signals for supply to speaker 58 at the tip of the interior lobe of the ear module 10. First, second and third analog-to-digital converters 60, 61 and 62 are coupled to three microphones 64, 65 and 66 on the exterior lobe 67, see FIG. 5, of the ear module. As discussed below, microphones 64-66, which are functional elements of ear-level device 10, can be converted between functioning as directional microphones and omnidirectional microphones. The analog-to-digital converters 60, 61, 62 supply digital inputs to the digital signal processor 52.

The nonvolatile memory 54 stores audio data associated with various functions that can be carried out by the companion mobile phone. The nonvolatile memory 54 also stores computer programs and configuration data for controlling the ear module 10. These include providing a control program, a configuration file and may include, in some examples, audio data for the personalized hearing profiles, also called sound profiles. The programs are executed by the digital signal processor 52 in response to user input on the ear module 10. In addition, the nonvolatile memory 54 stores a data structure for a set of variables used by the computer programs for audio processing, where each mode of operation of the ear module may have one or more separate subsets of the set of variables, referred to as "presets" herein.

The radio module 51 is coupled to the digital signal processor 52 by a data/audio bus 70 and a control bus 71. The radio module 51 includes, in this example, a Bluetooth® radio/baseband/control processor 72. The processor 72 is coupled to an antenna 74 and to nonvolatile memory 76. The nonvolatile memory 76 stores computer programs for operating the radio module 51 and control parameters as known in the art. The nonvolatile memory 76 is adapted to store parameters for establishing radio communication links with companion devices. The processing module 50 also controls the man-machine interface 48 for the ear module 10, including accepting input data from various functional elements including on-off switch 42, main button 44 and touchpad 45 and providing output data to a functional element in the form of status LED 46.

In the illustrated embodiment, the data/audio bus 70 transfers pulse code modulated audio signals between the radio module 51 and the processing module 50. The control bus 71 in the illustrated embodiment comprises a serial bus for connecting universal asynchronous receive/transmit UART ports on the radio module 51 and on a processing module 50 for passing control signals.

A power control bus 75 couples the radio module 51 and the processing module 50 to power management circuitry 77. The power management circuitry 77 provides power to the microelectronic components on the ear module in both the processing module 50 and the radio module 51 using a rechargeable battery 78. A battery charger 79 is coupled to the battery 78 and the power management circuitry 77 for recharging the rechargeable battery 78.

The microelectronics and transducers shown in FIG. 2 are adapted to fit within the ear module 10.

The ear module 10 operates in a plurality of modes including, in the illustrated example, an environmental mode for listening to conversation or ambient audio, a phone mode supporting a telephone call, and a companion microphone mode for playing audio picked up by the companion microphone which may be worn for example on the lapel of a friend. In some examples, ear module 10 can also operate in a hearing profile generation mode for generating a personalized hearing profile based upon real-time feedback to the user. The hearing profile generation mode is described in co-pending U.S. patent application Ser. No. 12/778,930, entitled Personalized Hearing Profile Generation with Real-Time and Feedback, filed on 12 May 2010 and assigned to the same assignee as this application, the disclosure of which is incorporated by reference.

The signal flow in the device changes depending on which mode is currently in use. The environmental mode does not involve a wireless audio connection. The audio signals originate on the ear module 10. The phone mode, the companion microphone mode, and the hearing profile generation mode involve audio data transfer using the radio module 51. In the phone mode, audio data is both sent and received through a communication channel between the radio and the phone. In the companion microphone mode, the ear module receives a unidirectional audio data stream from the companion microphone. In the hearing profile generation mode, the ear module 10 receives a profile data stream and may receive an audio stream from the companion mobile phone 11.

The control circuitry in the device is adapted to change modes in response to commands exchanged by the radio, and in response to user input, according to priority logic. For example, the system can change from the environmental mode to the phone mode and back to the environmental mode, the system can change from the environmental mode to the companion microphone mode and back to the environmental mode. For example, if the system is operating in environmental mode, a command from the radio which initiates the companion microphone may be received by the system, signaling a change to the companion microphone mode. In this case, the system loads audio processing variables (including preset parameters and configuration indicators) that are associated with the companion microphone mode. Then, the pulse code modulated data from the radio is received in the processor and up-sampled for use by the audio processing system and delivery of audio to the user. At this point, the system is operating in a companion microphone mode. To change out of the companion microphone mode, the system may receive an environmental mode command via the serial interface from the radio. In this case, the processor loads audio processing variables associated with the environmental mode. At this point, the system is again operating in the environmental mode.

If the system is operating in the environmental mode and receives a phone mode command from the control bus via the radio, it loads audio processing variables associated with the phone mode. Then, the processor starts processing the pulse code modulated data for delivery to the audio processing algorithms selected for the phone mode and providing audio to the microphone. The processor also starts processing microphone data for delivery to the radio and transmission to the phone. At this point, the system is operating in the phone mode. When the system receives an environmental mode command, it then loads the environmental audio processing variables and returns to environmental mode.

Figure 3:
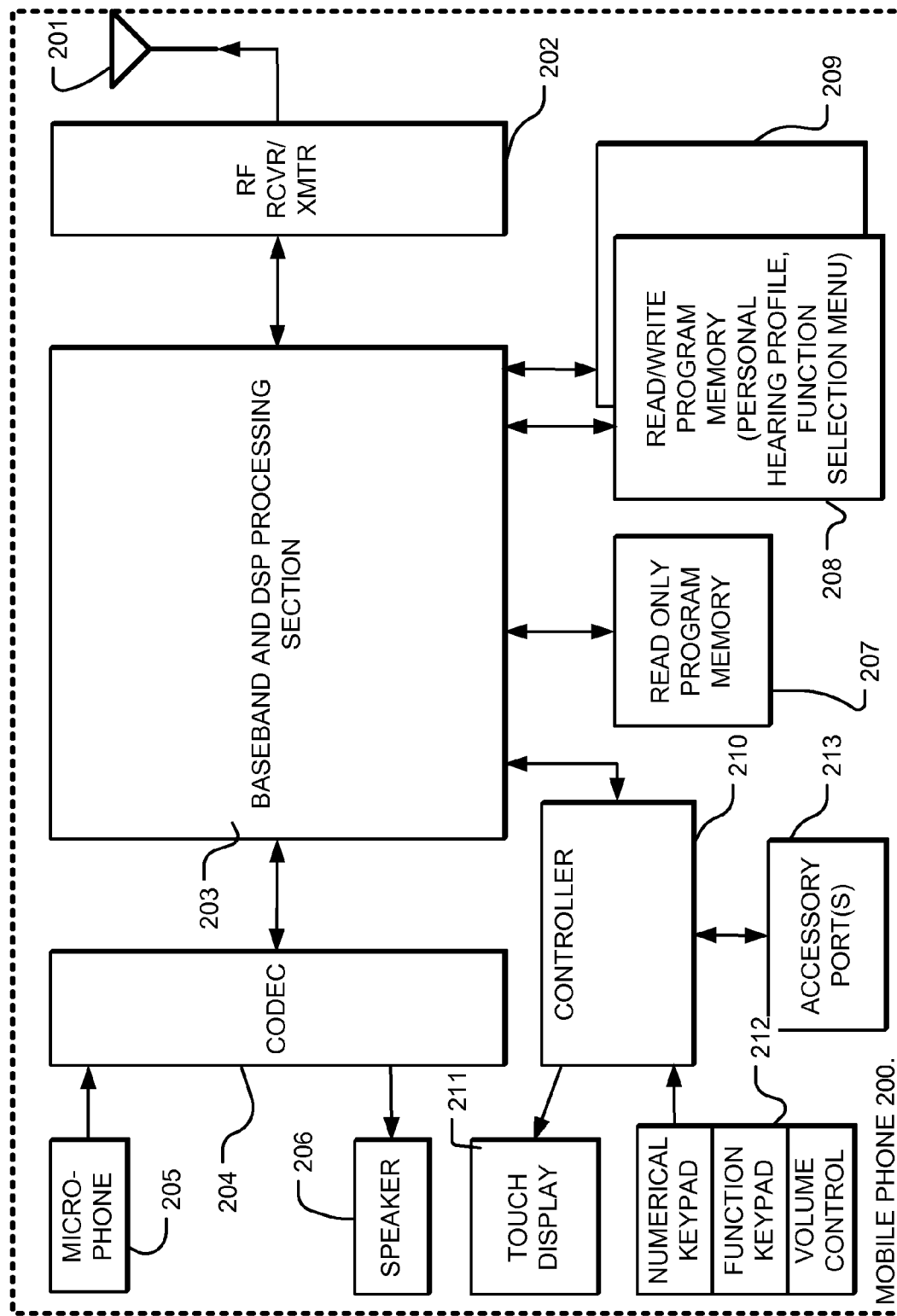
FIG. 3 is a simplified block diagram of circuitry in a mobile phone, operable as a companion module for an ear-level device and supporting the control of at least one functional element of an ear-level device, as described herein.

FIG. 3 is a simplified diagram of a mobile phone 200, representative of personal communication devices which provide resources for the user to select personal hearing profiles, discussed below. The mobile phone 200 includes an antenna 201 and a radio including a radio frequency RF receiver/transmitter 202, by which the phone 200 is coupled to a wireless communication medium, according to one or more of a variety of protocols. In examples described herein, the RF receiver/transmitter 202 can include one or more radios to support multiprotocol/multiband communications for communication with the wireless service provider of the mobile phone network, as well as the establishment of wireless local radio links using a protocol like Bluetooth® or WIFI protocols. The receiver/transmitter 202 is coupled to baseband and digital signal processor DSP processing section 203, in which the audio signals are processed and call signals are managed. A codec 204, including analog-to-digital and digital-to-analog converters, is coupled to the processing section 203. A microphone 205 and a speaker 206 are coupled to the codec 204.

Read-only program memory 207 stores instructions, parameters and other data for execution by the processing section 203. In addition, a read/write memory 208 in the mobile phone stores instructions, parameters, personal hearing profiles and other data for use by the processing section 203. There may be multiple types of read/write memory on the phone 200, such as nonvolatile read/write memory 208 (flash memory or EEPROM for example) and volatile read/write memory 209 (DRAM or SRAM for example), as shown in FIG. 3. Other embodiments include removable memory modules in which instructions, parameters and other data for use by the processing section 203 are stored.

An input/output controller 210 is coupled to a touch sensitive display 211, to user input devices 212, such as a numerical keypad, a function keypad, and a volume control switch, and to an accessory port (or ports) 213. The accessory port or ports 213 are used for other types of input/output devices, such as binaural and monaural headphones, connections to processing devices such as PDAs or personal computers, alternative communication channels such as an infrared port or Universal Serial Bus USB port, a portable storage device port, and other things. The controller 210 is coupled to the processing section 203. User input concerning call set up and call management, control of different functional elements of the ear module, user preference and environmental noise factors is received via the input devices 212 and optionally via accessories. User interaction is enhanced, and the user is prompted to interact, using the display 211 and optionally other accessories. Input may also be received via the microphone 205 supported by voice recognition programs, and user interaction and prompting may utilize the speaker 206 for various purposes.

In the illustrated embodiment, memory 208 stores a program for displaying a function selection menu user interface on the display 211, such that the user can select one or more functional elements of ear module 10 to be changed, selected or otherwise controlled by the user through a functional element control program as discussed below.

Figure 4:
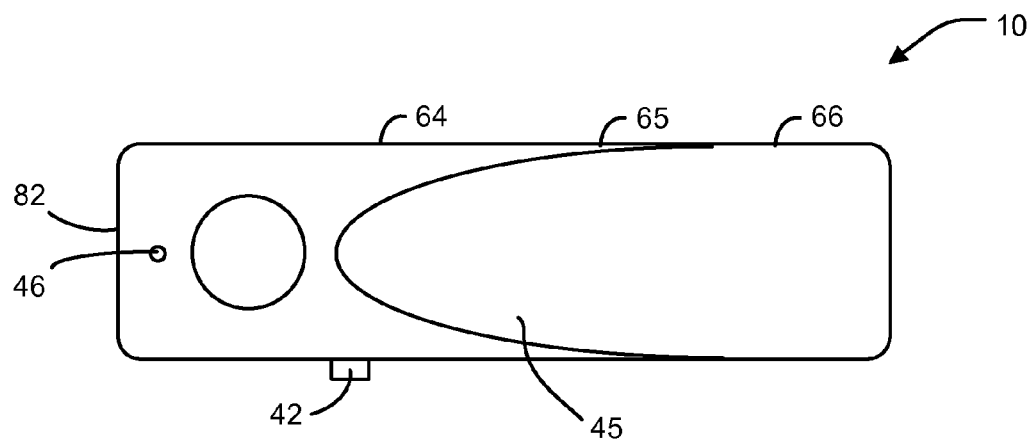
FIGS. 4 and 5 are front and right side views of the ear-level device of FIG. 1.
Figure 5:
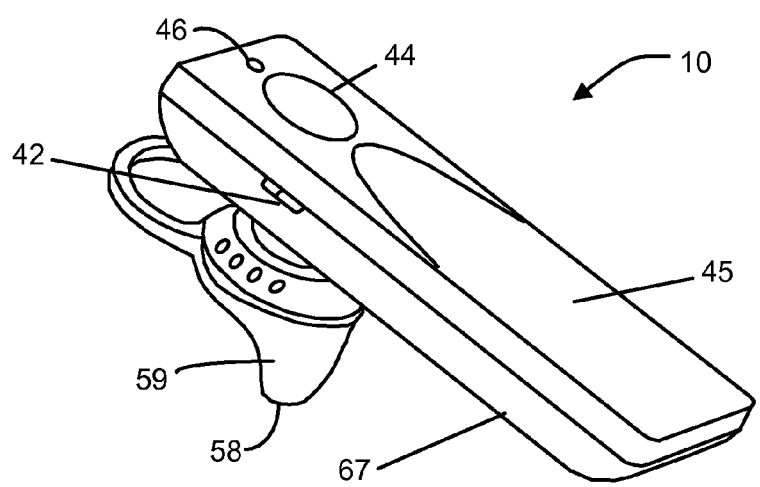

FIGS. 4 and 5 show one example of ear module 10. In addition to the components and functional features discussed above, ear module 10 also includes a micro USB port 82, for battery charging and data transfer, at the upper end of exterior lobe 67. In one example, status LED 46 performs different functions depending on the operational status of ear module 10. In this example, when the on-off switch 42 is off, LED 46 flashes red. When on-off switch 42 is on, LED 46 flashes green. When ear module 10 is charging, LED 46 is a steady red color and turns to a steady green color when fully charged. Main button 44, in this example, also has different functions depending upon the operational status of ear module 10. To answer an incoming call and to end a call, main button 44 is tapped once. Otherwise, tapping main button 44 once activates voice dialing of mobile phone 11, while tapping main button 44 twice redials the last number called. Touchpad 45 is used to control volume with an upward movement over the touchpad increasing the volume and a downward movement decreasing the volume.

Figure 6:
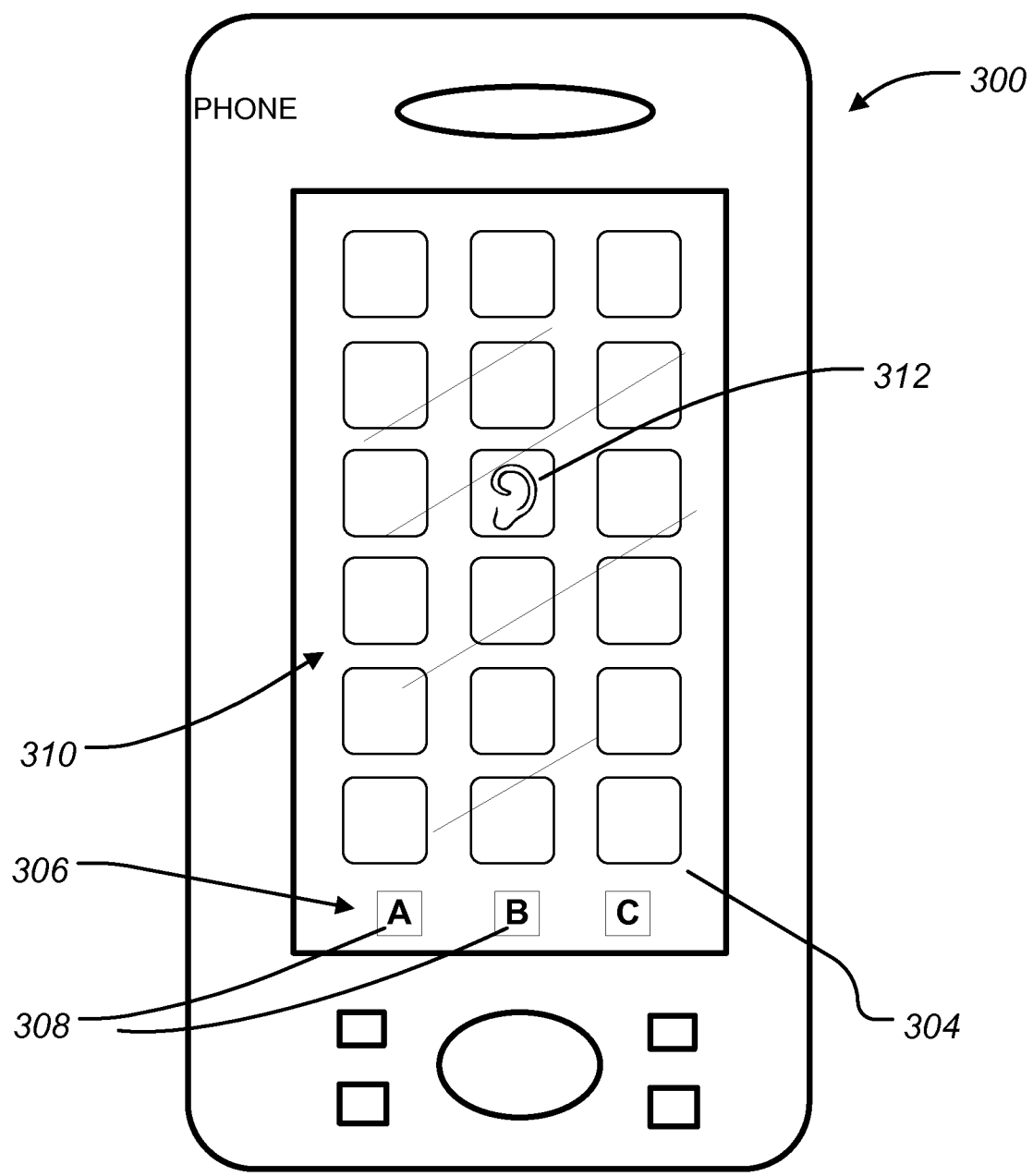
FIG. 6 is a front view of a mobile phone having a touch screen displaying application icons, including an ear module application icon.

The method of controlling one or more functional elements of ear module 10 will be discussed primarily with reference to FIGS. 4-10. FIG. 6 illustrates mobile phone 300 having a graphical user interface including a touch screen type of graphic display 304, sometimes referred to as touch screen 304. An example of mobile phone 300 is the iPhone® made by Apple Computer. Touch screen 304 includes a task bar 306 having system icons 308. Application icons 310 are displayed on touch screen 304 and include an ear module application icon 312.

Figure 7:
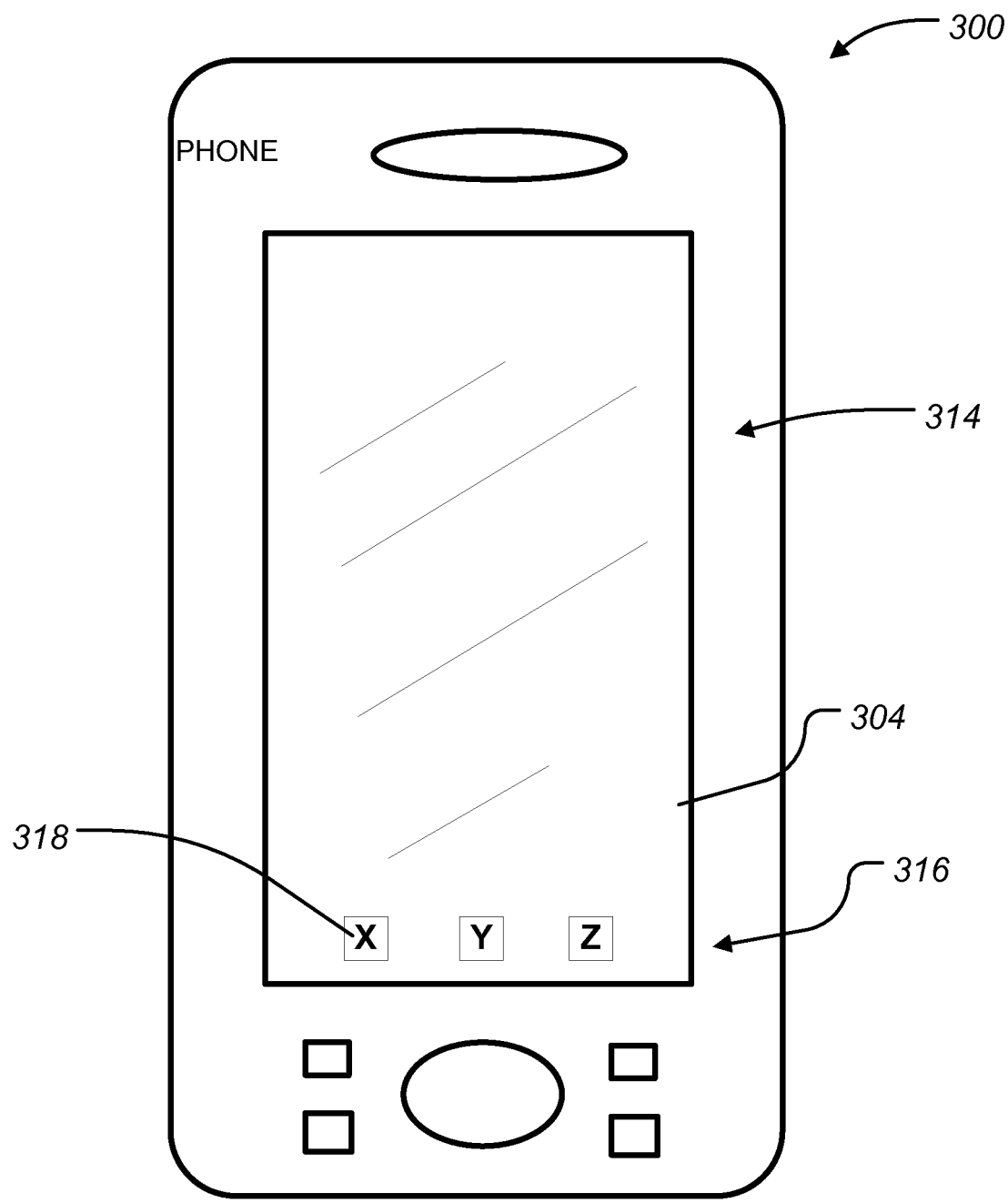
FIG. 7 shows the screen image displayed on the touch screen of the mobile phone of FIG. 4 after selecting the ear module application icon in FIG. 6.
Figure 8:
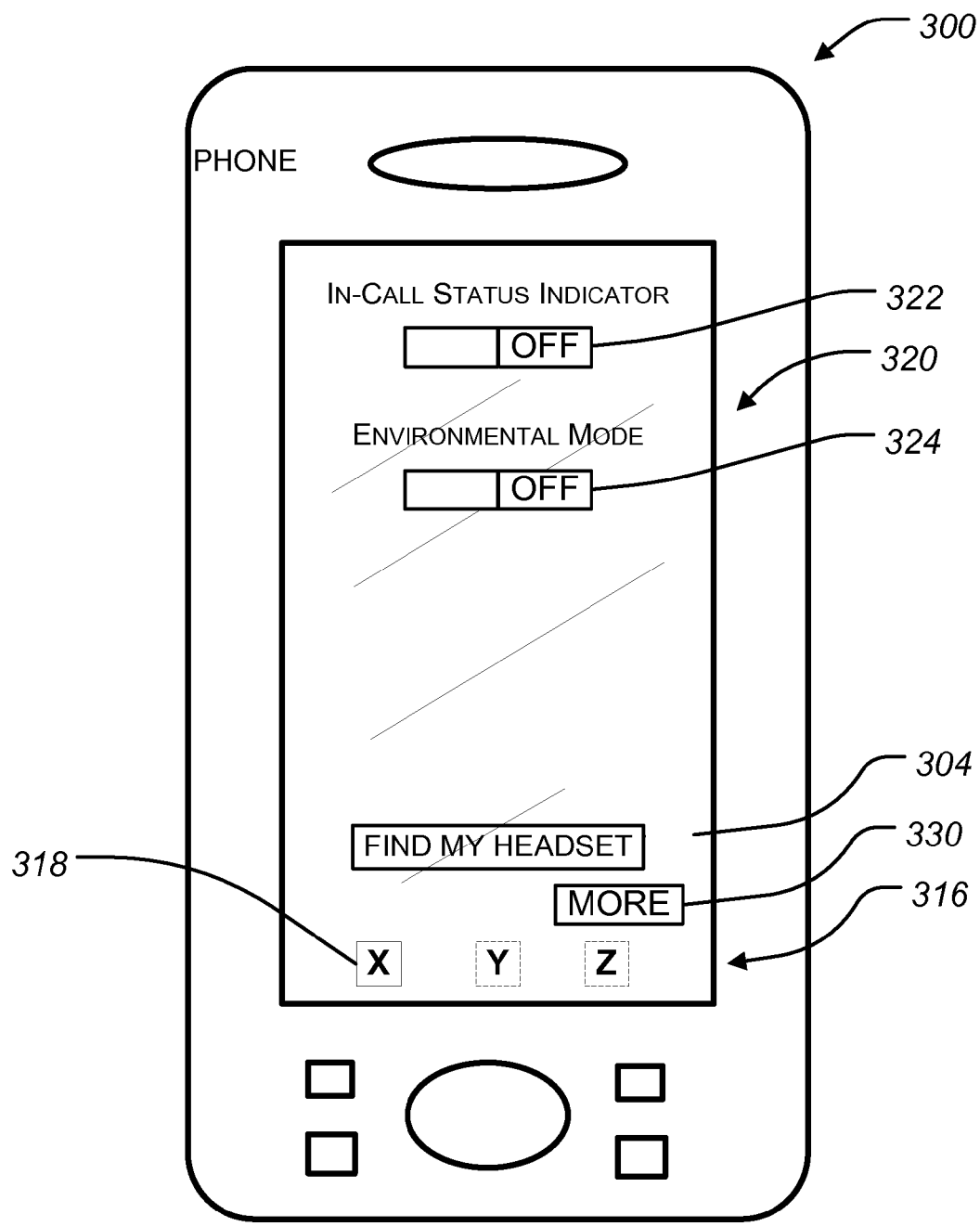
FIG. 8 shows the tools screen image displayed after selecting the tools icon in FIG. 7.
Figure 9:
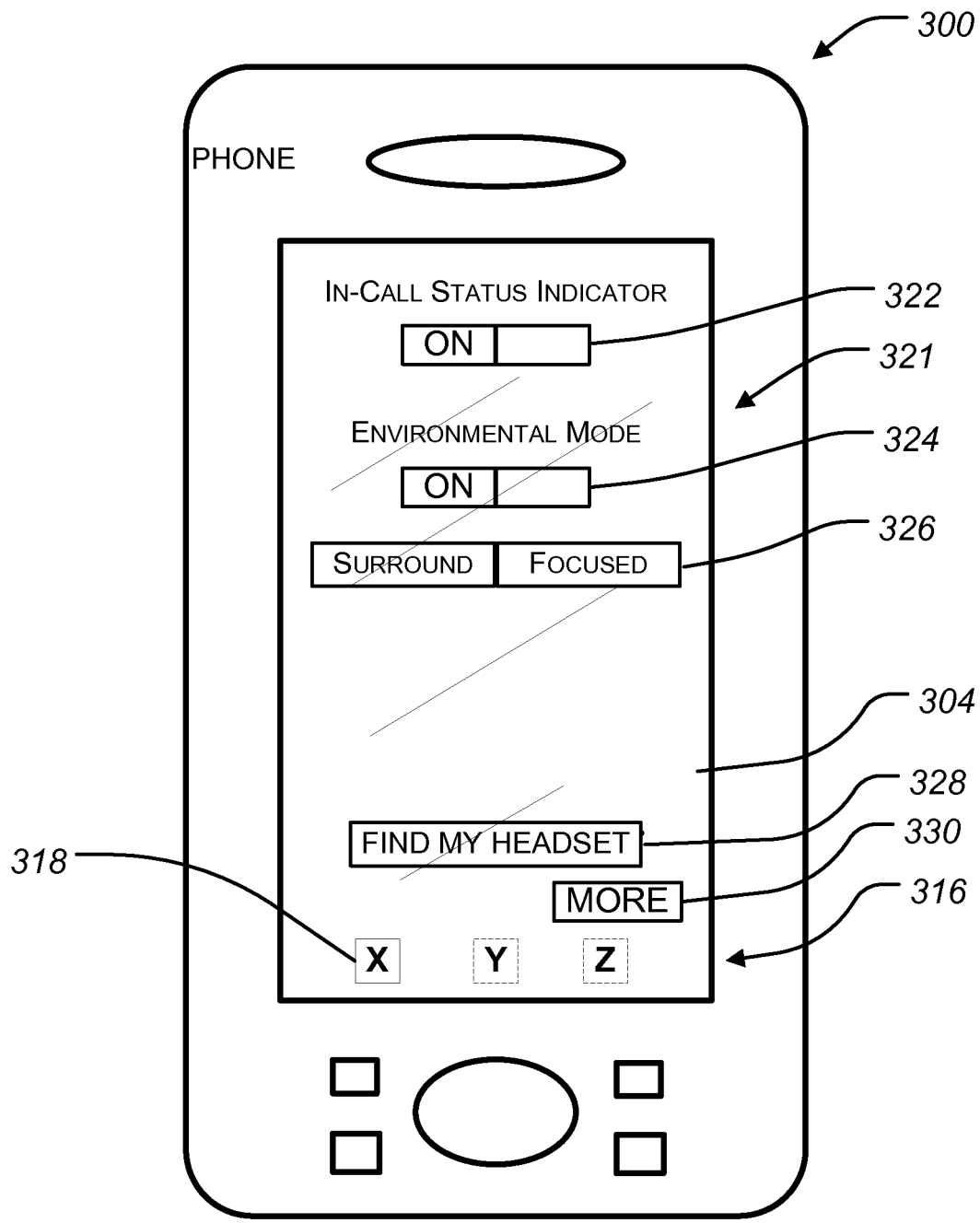
FIG. 9 shows a supplemental tools screen image displayed after actuating the environmental mode widget on the screen image of FIG. 8.

Touching ear module application icon 312 causes the ear module application program stored in mobile phone 300 to be accessed; the ear module application program then displays the screen image 314 shown in FIG. 7. Screen image 314 includes a task bar 316 having a tools icon 318. Pressing on tools icon 318 causes the ear module application program to display the tools screen image 320 shown in FIG. 8. In other examples, tools screen image 320 can be accessed in other manners, such as directly from touch screen 304 of FIG. 6. Tools screen image 320 provides an interface for the user to interact with ear module 10 in various ways. In this example, an in-call status indicator widget 322 is displayed to permit the user to permit LED 46 to provide a visual indication of the in-call status. Turning widget 322 on, see the supplemental tools screen image 321 of FIG. 9, causes cell phone 300 to transmit an appropriate control instruction to ear module 10 causing LED 46 to flash indicating that a telephone call is in progress. Tools screen image 320 also includes an environmental mode widget 324. Turning on widget 324 causes microphone widget 326 to be displayed as shown in FIG. 9. Actuating microphone widget 326 causes an appropriate control instruction to be transmitted to ear module 10 causing microphones 64-66 to be placed in either an omnidirectional functional state (surround) or a unidirectional functional state (focused) depending upon the status of microphone widget 326. In either case, turning environmental mode widget 324 on allows the user to hear environmental sounds when not on a telephone call.

In this example, tools screen 320 also includes an audible location alarm icon 328 that, when actuated, causes an appropriate control instruction to be transmitted to ear module 10 causing ear module 10 to broadcast an alarm signal to help the user to find a lost or misplaced ear module. This feature is discussed in co-pending U.S. patent application Ser. No. 12/786,707, filed 25 May 2010, entitled Method For Generating Audible Location Alarm From Ear Level, the disclosure of which is incorporated by reference. If all of the features associated with the tools icon 318 cannot be displayed on one tools screen image, one or more additional tools screen images can be accessed and displayed using the more screens icon 330.

Task bar 316 may include additional icons, such as an icon for displaying information relating to the current sound level being received by ear module 10. This information may be displayed in one or more of a graphical form, such as in the form of a meter, a digital form, such as 41 dB A, and as a text message associated with the particular sound level, such as: soft voice, comfortable environment. In this manner, much more information than could ever be provided directly by ear module 10 is available for the user in a clear, readily accessible manner. Another additional icon that may be present in task bar 316 is a battery icon. Selecting the battery icon may provide a screen display showing both a visual component and a digital readout component relating to the remaining battery life for the battery in ear module 10. Again, through the use of a companion device, typically a mobile phone, much more information regarding the operational status of ear module 10 is available to the user.

As demonstrated above, control of functional elements of or associated with ear module 10 can be by controlling the behavior of various functional elements, such as actuating or deactuating an in-call status indicator using LED 46 of ear module 10, adjusting the range of the volume of the sound produced by speaker 58, actuation or modification of on-off switch 42, the choice of omnidirectional or directional mode for microphones 64-66, the muting of the microphones, and sensitivity adjustment of the microphones. In addition, the ear module application program can be designed to permit the assignment of particular functions to particular buttons or other inputs on ear module 10. For example, touchpad 45 could be assigned to function as an input to mute or un-mute ear module 10 instead of, or in addition to, acting as a volume control. Having touchpad 45 work as both a volume control and as a mute switch could be accomplished by having a mute function controlled by tapping one's finger on touchpad 45 with the volume function controlled by sliding one's finger over 45. The ear module application program can also be designed to permit a user to replace the function provided by hardware on the ear module 10 with the equivalent software buttons on, for example, an appropriate screen image on a mobile phone or other companion device. Instead of replacing the function provided by hardware on the ear module 10, the equivalent function could also be provided through the companion device so that the same function could be accomplished using hardware, typically buttons, switches or touchpads, on ear module 10 and also using the companion device. For example, a user may want to have the ability to control volume using touchpad 45 and using mobile phone 300.

Another aspect of the invention relates to the recognition that many electronic devices provide the user with a wide range of options and features, many of which are not important to or used by most users. Often these actions, functions and features are accessed through a tree structure with various levels displayed on various screens. Although there might be shortcuts to individual functions or features, the shortcuts may not be readily remembered by the user. An aspect of the invention is the recognition that there is an advantage to having the user select what functions they are most interested in and also select an input for each function. When the user chooses the particular input for a particular function, the user is much more likely to remember the correct input for a particular function. For example, the user may decide that he or she would like that a call in progress be muted or un-muted by a single tap on touchpad 45, a double tap on touchpad 45 would terminate the call, and a single tap with no call in progress would be a command to call home. According to this aspect of the invention, because the user picks the functions the user is most interested in and assigns the action calling up the function, the user is more likely to remember what actions go with what functions. In some examples, only some of the hardware inputs of ear module 10 may come with a factory-assigned function so that the user can select what functions will go with what hardware inputs. The selection of functions would typically be through a menu of possible alternatives on an appropriate screen of graphic display 304.

Figure 10:
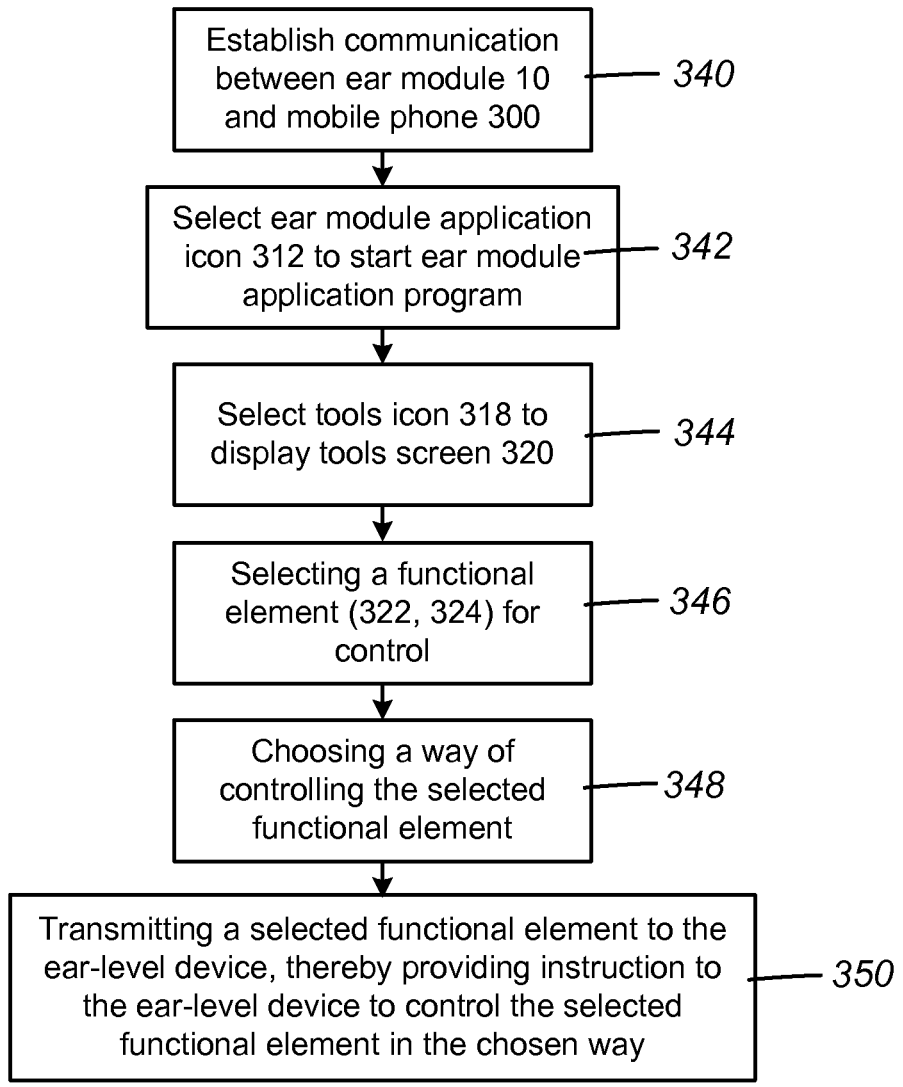
FIG. 10 is a simplified flowchart showing basic steps for one example of the invention for controlling at least one functional element of an ear-level device.

In use, at least one functional element of an ear-level device, such as ear module 10, can be controlled as follows. Communication between ear module 10 and a companion device, such as mobile phone 300, is initiated. See 340 in FIG. 10. The communication is typically wireless but it can be wired. The initiation of the ear module application program, see 342 in FIG. 10, is typically carried out by the user selecting ear module application icon 312 which opens up screen image 314. A signal indicating the initiation of the ear module application program is transmitted by the mobile phone 300 to the ear module 10. Tools icon 318 is then selected from screen image 314, see 344 in FIG. 10, causing the display of tools screen image 320. One of the functional elements displayed, such as the in-call status indicator functional element or the environmental mode functional element, is selected for control. See 346 in FIG. 10. If control is desired for the in-call status indicator, the in-call status indicator widget 322 is manipulated to turn the in-call status indicator on or off. See 348 in FIG. 10. This causes telephone 300 to transmit an in-call status indicator control instruction to ear module 10. See 300 in FIG. 10. Ear module 10 uses this instruction to control whether call status LED 46 is or is not illuminated according to the call status. If control is desired for the environmental mode, environmental mode widget 324 is manipulated to an on or off status; if the on status is chosen, the supplemental tools screen image 321 is displayed along with microphone widget 326. Using microphone widget 326 the user can select whether microphones 64-66 are in an omni-directional, surround mode or a unidirectional, focused mode. This causes telephone 300 to transmit a microphone control instruction to ear module 10. Ear module 10 uses this instruction to place microphones 64-66 in an omnidirectional, surround mode or a unidirectional, focused mode.

After selecting ear module application icon 312, which causes screen image 314 to be displayed, other icons associated with the ear module application are, in some examples, found along task bar 316. For example one such icon could be a sound level icon which, if chosen, would cause the display of the ambient sound level received by microphone 64, 65, 66. The sound level display would preferably be in the form of a digital display, an analog meter display or a text-based description of the sound level, or a combination thereof. Another such icon could be a battery life icon which, if chosen, would cause the display of the remaining battery life of the ear module battery. The battery life display would preferably be in the form of a digital display or a graphic display, or a combination thereof. It can be appreciated that by the use of the ear module application program with a companion device, such as mobile phone 300, a significant amount of information relating to ear module 10 can be easily and quickly provided to the user in a manner not possible by the ear module alone.

In addition to controlling the various functional elements discussed above, the above process can also be used to select or input the various functional elements associated with a voice menu feature, when a voice menu feature is available with ear module 10, and transmit the selected functional elements to the ear module. This feature is discussed above with regard to U.S. patent application Ser. No. 12/716,209.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Any and all patents, patent applications and printed publication referred to above are incorporated by reference for all purposes.

What is claimed is:

1. A method of controlling at least one functional element of an ear-level device, the ear-level device of a type comprising a plurality of previously programmed functional elements executed by circuitry on the ear level device, a memory, a microphone and a speaker, each coupled to a processor, the method comprising:
   establishing communication between the ear-level device and a companion device, the companion device comprising a graphical user interface;
   presenting, through the graphical user interface, a plurality of icons corresponding to a corresponding plurality of previously programmed functional elements of the ear-level device;
   accepting input via the graphical user interface of a signal selecting one of the plurality of previously programmed functional elements;
   the signal selecting one of the plurality of previously programmed functional elements selects a functional element that does not affect sound processing as the selected previously programmed functional element;
   accepting input via the graphical user interface of a signal identifying a way of controlling the selected previously programmed functional element of the ear level device; and
   transmitting a control instruction, corresponding to the selected functional element, from the companion device to the ear-level device, thereby providing instruction to the ear-level device to operate according to the selected functional element.

2. The method according to claim 1, wherein the communication establishing step is carried out with a mobile phone as the companion device.

3. The method according to claim 1, wherein:
   the identified way of controlling the selected previously programmed functional element is an enabling/disabling way of controlling the selected previously programmed functional element; and
   the transmitting step comprises transmitting an enabling/disabling instruction for the selected previously programmed functional element to the ear-level device, thereby providing instruction to the ear-level device to enable/disable the selected previously programmed functional element.

4. The method according to claim 1, wherein the presenting step comprises presenting an icon corresponding to one of said previously programmed functional elements which is controllable by a user input element of the ear-level device.

5. The method according to claim 1, wherein the presenting step comprises presenting an icon corresponding to one of said previously programmed functional elements which is not controllable by a user input element of the ear-level device.

6. A method of controlling at least one functional element of an ear-level device, the ear-level device of a type comprising a plurality of previously programmed functional elements executed by circuitry on the ear level device, a memory, a microphone and a speaker, each coupled to a processor, the method comprising:
  establishing communication between the ear-level device and a companion device, the companion device comprising a graphical user interface;
  presenting, through the graphical user interface, a plurality of icons corresponding to a corresponding plurality of previously programmed functional elements of the ear-level device;
  accepting input via the graphical user interface of a signal selecting one of the plurality of previously programmed functional elements;
  the signal selecting one of the plurality of previously programmed functional elements of the first accepting step selects an in-call status indicator light of the ear-level device as the selected previously programmed functional element;
  accepting input via the graphical user interface of a signal identifying a way of controlling the selected previously programmed functional element of the ear level device;
  the signal of the second accepting step identifying a chosen way of controlling the in-call status indicator light provides the ability to enable/disable the in-call status indicator light;
  transmitting a control instruction, corresponding to the way of controlling the selected previously programmed functional element, from the companion device to the ear-level device, thereby providing instruction to the ear-level device to control the selected functional element in the way of controlling; and
  the transmitting step comprises transmitting an enabling/disabling in-call status indicator light control instruction to the ear-level device, thereby providing instruction to the ear-level device to enable/disable the in-call status indicator light carried by the ear-level device.

7. A method of controlling at least one functional element of an ear-level device, the ear-level device of a type comprising a plurality of previously programmed functional elements executed by circuitry on the ear level device, a memory, a microphone and a speaker, each coupled to a processor, the method comprising:
  establishing communication between the ear-level device and a companion device, the companion device comprising a graphical user interface;
  presenting, through the graphical user interface, a plurality of icons corresponding to a corresponding plurality of previously programmed functional elements of the ear-level device;
  accepting input via the graphical user interface of a signal selecting one of the plurality of previously programmed functional elements;
  the signal selecting one of the plurality of previously programmed functional elements of the first accepting step selects an omnidirectional/directional microphone of the ear-level device as the selected previously programmed functional element;
  accepting input via the graphical user interface of a signal identifying a way of controlling the selected previously programmed functional element of the ear level device;
  the signal of the second accepting step identifying a chosen way of controlling the omnidirectional/directional microphone provides the ability to operate either an omnidirectional microphone or a directional microphone;
  transmitting a control instruction, corresponding to the way of controlling the selected previously programmed functional element, from the companion device to the ear-level device, thereby providing instruction to the ear-level device to control the selected functional element in the way of controlling; and
  the transmitting step comprises transmitting a microphone omnidirectional control instruction or a microphone directional control instruction to the ear-level device, thereby providing instruction to the ear-level device to operate in an omnidirectional manner or a directional manner.

8. The method according to claim 1, further comprising:
  the signal of the second accepting step identifying a way of controlling the selected previously programmed functional element provides the ability to enable a new function for the selected functional element; and
  the transmitting step comprises transmitting a new function instruction from the companion device to the ear-level device, thereby providing instruction to the ear-level device for the selected functional element to operate according to the new function.

9. The method according to claim 1, wherein the signal of the second accepting step identifying a chosen way of controlling the selected previously programmed functional element provides, through the companion device, a way of controlling the selected previously programmed functional element from a plurality of ways of controlling the selected previously programmed functional element.

10. The method according to claim 1, further comprising monitoring a previously programmed functional element of the ear-level device using the companion device.

11. The method according to claim 10, wherein the monitoring step comprises monitoring a sound level at the microphone of the ear-level device.

12. A method of controlling at least one functional element of an ear-level device, the ear-level device of a type comprising a plurality of previously programmed functional elements executed by circuitry on the ear level device, a memory, a microphone and a speaker, each coupled to a processor, the method comprising:
  establishing communication between the ear-level device and a companion device, the companion device comprising a touch screen graphical user interface;
  the communication establishing step being carried out with a mobile phone as the companion device;
  presenting, through the touch screen graphical user interface, a plurality of icons corresponding to a corresponding plurality of previously programmed functional elements of the ear-level device;
  accepting input via the touch screen graphical user interface of a signal selecting one of the plurality of functional elements;
  the signal selecting one of the plurality of previously programmed functional elements selects a functional element that does not affect the sound processing from the following group of functional elements as the selected previously programmed functional element: a microphone, an on-off switch, an input button, a touchpad, an indicator light, and a speaker; and
  accepting input through the touch screen graphical user interface of a signal identifying a way of controlling the selected previously programmed functional element of the ear level device by enabling/disabling the selected functional element;

transmitting an enabling/disabling instruction for the selected previously programmed functional element from the companion device to the ear-level device, thereby providing instruction to the ear-level device to enable/disable the selected functional element; and monitoring a functional aspect of the ear-level device using the companion device.

13. The method according to claim 12, further comprising:

the signal of the second accepting step identifying a chosen way of controlling the selected previously programmed functional element provides the ability to enable a new function for the selected functional element; and the transmitting step comprises transmitting a new function instruction from the companion device to the ear-level device based upon the new function choosing step, thereby providing instruction to the ear-level device for the selected functional element to operate according to the new function.

14. The method according to claim 12, wherein the signal of the second accepting step identifying a chosen way of controlling the selected previously programmed functional element light provides, through the companion device, a way of controlling the selected functional element from a plurality of ways of controlling the selected functional element.

15. The method according to claim 12, wherein the monitoring step comprises monitoring a sound level at the microphone of the ear-level device.

16. A method of controlling at least one functional element of an ear-level device, the ear-level device of a type comprising a plurality of previously programmed functional elements executed by circuitry on the ear level device, a memory, a microphone and a speaker, each coupled to a processor, the method comprising:

establishing communication between the ear-level device and a companion device, the companion device comprising a touch screen graphical user interface;

presenting, through the touch screen graphical user interface, a plurality of icons corresponding to a corresponding plurality of previously programmed functional elements of the ear-level device;

accepting input via the touch screen graphical user interface of a signal selecting one of the plurality of previously programmed functional elements;

the signal selecting one of the plurality of previously programmed functional elements selects a functional element that does not affect the sound processing from the following group of functional elements as the selected previously programmed functional element: a microphone, an on-off switch, an input button, a touchpad, an indicator light, and a speaker;

accepting input via the touch screen graphical user interface of a signal identifying a way of controlling the selected previously programmed functional element of the ear level device; and transmitting a control instruction, corresponding to the way of controlling the selected previously programmed functional element, from the companion device to the ear-level device, thereby providing instruction to the ear-level device to control the selected functional element in the way of controlling.

17. The method according to claim 1, wherein the signal selecting one of the plurality of previously programmed functional elements is carried out with the selected functional element being selected from the following group of functional elements: a microphone, an on-off switch, an input button, a touchpad, an indicator light, and a speaker.

* * * * *